(No Model.)
C. G. CURTIS.
COMMUTATOR CONNECTION FOR ELECTRIC MOTORS OR GENERATORS.
No. 473,567. Patented Apr. 26, 1892.
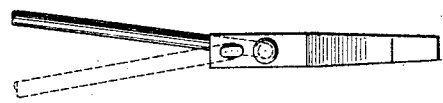
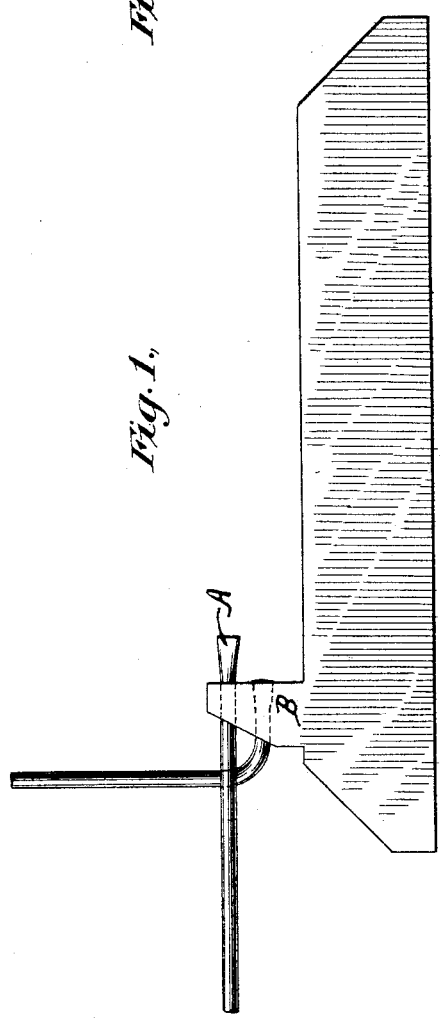
Witnesses
C. E. Ashley
Chas. L. Robinson
Inventor
Chas. G. Curtis

UNITED STATES PATENT OFFICE.

CHARLES G. CURTIS, OF NEW YORK, N. Y., ASSIGNOR TO THE CURTIS ELECTRIC MANUFACTURING COMPANY, OF WEST VIRGINIA.

COMMUTATOR CONNECTION FOR ELECTRIC MOTORS OR GENERATORS.

SPECIFICATION forming part of Letters Patent No. 473,567, dated April 26, 1892.

Application filed August 26, 1891. Serial No. 403,779. (No model.)

*To all whom it may concern:*

Be it known that I, CHARLES G. CURTIS, of New York, N. Y., have invented a new and useful Improvement in Commutator Connections for Electric Motors or Generators, of which the following is a specification.

Heretofore a great desideratum in the manufacture of electric motors and generators has been a mode of connecting the wires with the commutator, which would secure an excellent electrical connection, dispense entirely with the use of solder, could not work loose, and which could be easily and cheaply made and renewed if desirable.

The ordinary mode of making the commutator connections by screws or soldered joints, or both, is very unsatisfactory, not only because the screws readily work loose and the solder sometimes melts, but because the soldering is a troublesome operation and is likely to result in injury to the armature by pieces of solder accidentally falling into the winding.

By my improved mode of making commutator connections soldering is entirely dispensed with, a riveted form of joint is obtained, which presents a large surface of contact and forms an excellent electrical connection, the nature of the joint is such that the wire cannot work loose or impair the connection, the connection is quickly and readily made, and at the same time the connection can be withdrawn and a new one made with the greatest facility.

My invention is represented in the accompanying drawings, Figure 1 being a side view of a commutator-bar, showing my improved form of connection, and Fig. 2 being an end view of the same.

It is not necessary in my invention to form the commutator-bar with a long projecting portion or lug provided with slots or screws or hooks to receive the ends of the armature-wire, as heretofore. I simply form the bar with a lug, projection, or portion B, through which the ends of the armature-wires may be passed. I then bore or otherwise form holes through this portion of the bar, which, preferably, are of exactly the same size as the wire, but of course may be larger, if desirable. If two wires are to be connected with the same bar, I bore two holes, one above the other, as shown, or side by side, if the thickness of the lug will permit, or room may be found in this way for as many holes as there are wires to be connected. I then take the end of each wire and pass it through the hole, so that it projects a short distance—say one-quarter of an inch—beyond the edge of the lug, and I then enlarge this projecting end of the wire, as shown at A. This can be done very satisfactorily by simply flattening this end of the wires for a length of, say, one-quarter of an inch by a few blows of a light hammer sidewise against an anvil; but it may be done with great facility by pinching the wire by a pair of smooth-nose pliers, which flattens it to the desired extent sufficiently, so that its width becomes somewhat greater than the diameter or width of the hole. I then take a light hammer and drive the enlarged end of the wire back into the hole, or it may be forced back by a steady pressure, causing the wire to wedge itself so tightly in the hole that not only is a very tight and reliable joint obtained which cannot work loose, but a large area of contact and an excellent electrical connection is obtained. Any desired size or form of wire or armature conductor may evidently be connected with the commutator by my invention, provided the lug or portion B of the bar is large enough to receive it. If the wire be a flat bar or tape, the hole may be made of a corresponding shape, and the end enlarged in a similar way, so that it can be wedged back into the bar. Instead of enlarging the end of the wire or conductor by flattening it, as I here show at A in the drawings, the entire end may be enlarged by hammering and otherwise upsetting it, so that it becomes larger than the hole.

I do not herein claim the joint or connection, as such a claim is reserved to another pending application by me, Serial No. 411,656, filed November 12, 1891.

What I claim as my invention, and desire to secure by Letters Patent, is—

The herein-described mode of forming the commutator connections in an electric motor or generator, consisting in forming a hole in some portion of the commutator-bar, passing the end of the wire or conductor through this hole, then enlarging the projecting end of the wire, so that one of its dimensions is greater than the corresponding dimension of the hole, and then forcing the enlarged end back into the hole, substantially as described.

CHAS. G. CURTIS.

Witnesses:
CHAS. L. ROBINSON,
WM. RASQUIN, Jr.